US009000118B2

(12) United States Patent
Mispreuve et al.

(10) Patent No.: US 9,000,118 B2
(45) Date of Patent: Apr. 7, 2015

(54) POLYURETHANE FOAM

(75) Inventors: Henri Mispreuve, Wangen (CH); Reinold Naescher, Bubikon (CH); Kurt Schoenenberger, Siebnen (CH); Johan Frei, Jona (CH); Erik Vogel, Jonschwil (CH); Zacharias Grote, Zürich (CH)

(73) Assignee: Fritz Nauer AG, Wolfhausen (CH)

( * ) Notice: Subject to any disclaimer, the term of this patent is extended or adjusted under 35 U.S.C. 154(b) by 112 days.

(21) Appl. No.: 12/532,471

(22) PCT Filed: Mar. 20, 2008

(86) PCT No.: PCT/EP2008/002282
§ 371 (c)(1),
(2), (4) Date: Oct. 22, 2009

(87) PCT Pub. No.: WO2008/116605
PCT Pub. Date: Oct. 2, 2008

(65) Prior Publication Data
US 2010/0069518 A1    Mar. 18, 2010

(30) Foreign Application Priority Data

Mar. 24, 2007 (GB) .................. 0705685.6

(51) Int. Cl.
C08G 18/22 (2006.01)
C08G 18/00 (2006.01)
C08G 18/24 (2006.01)
C08G 18/08 (2006.01)
C08G 18/12 (2006.01)
C08G 18/16 (2006.01)
C08G 18/32 (2006.01)
C08G 18/40 (2006.01)
C08G 18/48 (2006.01)
C08G 18/66 (2006.01)
C08G 101/00 (2006.01)
C08L 83/00 (2006.01)

(52) U.S. Cl.
CPC .......... *C08G 18/244* (2013.01); *C08G 18/0876* (2013.01); *C08G 18/12* (2013.01); *C08G 18/165* (2013.01); *C08G 18/3281* (2013.01); *C08G 18/409* (2013.01); *C08G 18/485* (2013.01); *C08G 18/6688* (2013.01); *C08G 2101/005* (2013.01); *C08G 2101/0083* (2013.01); *C08L 83/00* (2013.01)

(58) Field of Classification Search
USPC ................................... 521/170, 174
See application file for complete search history.

(56) References Cited

U.S. PATENT DOCUMENTS

| 4,374,209 | A  | * | 2/1983  | Rowlands ....... 521/116 |
| 5,292,778 | A  | * | 3/1994  | Van Veen et al. ....... 521/126 |
| 5,484,820 | A  | * | 1/1996  | Mispreuve et al. ....... 521/174 |
| 5,618,854 | A  | * | 4/1997  | Skorpenske et al. ....... 521/164 |
| 6,403,664 | B1 | * | 6/2002  | Hoffmann et al. ....... 521/129 |
| 6,433,031 | B1 | * | 8/2002  | Ramael ....... 521/137 |
| 2004/0029986 | A1 | * | 2/2004  | Ghobary et al. ....... 521/155 |
| 2006/0270747 | A1 | * | 11/2006 | Griggs ....... 521/172 |
| 2007/0093565 | A1 | * | 4/2007  | Glos et al. ....... 521/112 |
| 2010/0227151 | A1 | * | 9/2010  | Rowlands et al. ....... 428/315.5 |

* cited by examiner

*Primary Examiner* — Melissa Rioja
(74) *Attorney, Agent, or Firm* — Notaro, Michalos & Zaccaria P.C.

(57) ABSTRACT

Polymer-modified polyol, for use as a starting material for polyurethane foam, is made by reacting an olamine, such as triethanolamine, with an isocyanate in the presence of a metal organic catalyst. The catalyst is a metal salt of an organic acid and the viscosity of the polymer-modified polyol is at least 2250 mPa·s. In one embodiment the catalyst is of the formulat $M(O.CO.R.CH_3)_2$ where M is a metal and R is a carbon chain of 6 to 20 carbons. A metal salt of a monohydroxy fatty acid, particularly ricinoleic acid may be used.

25 Claims, 3 Drawing Sheets

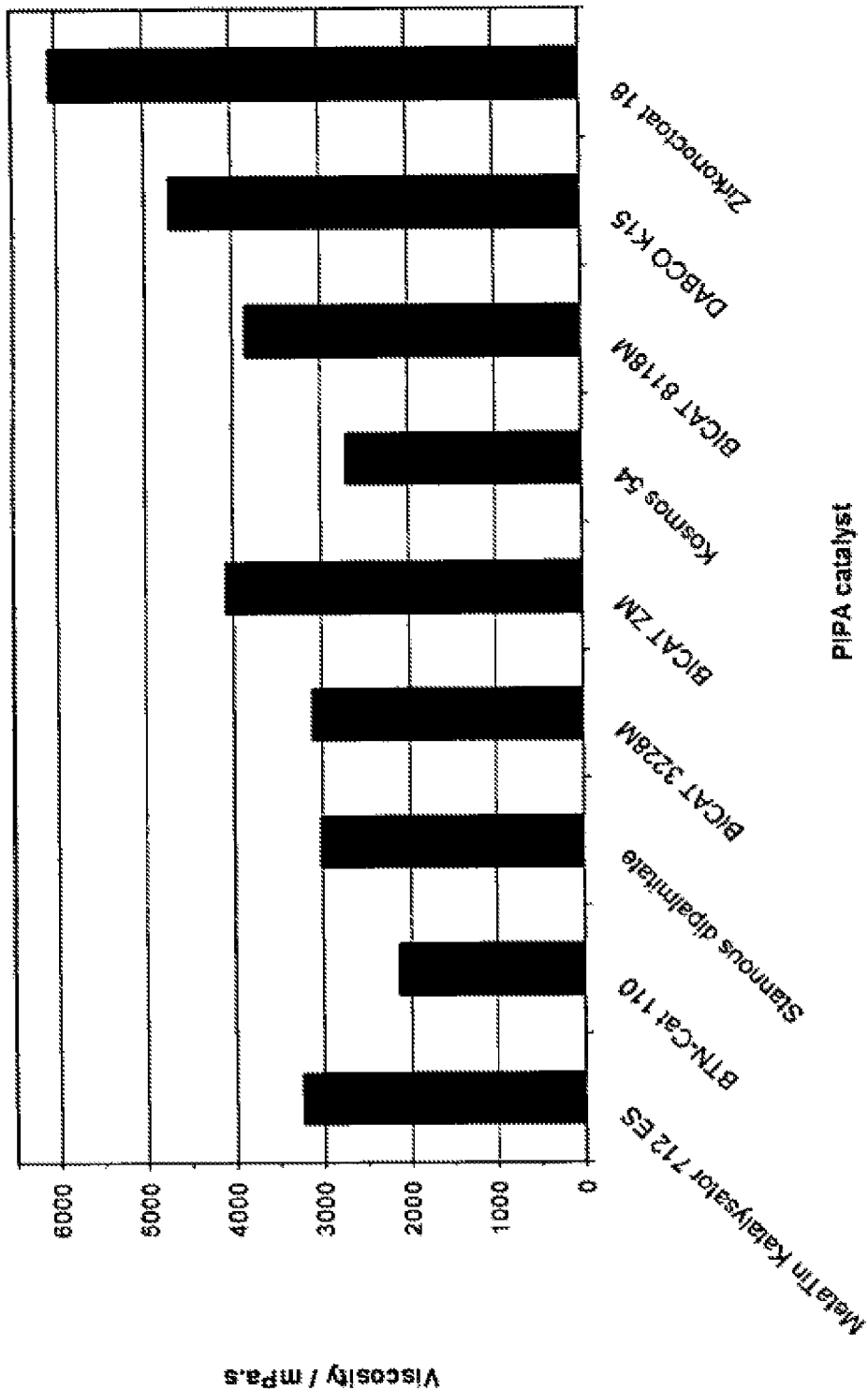
FIGURE 1: Viscosity of PIPA made by various catalysts

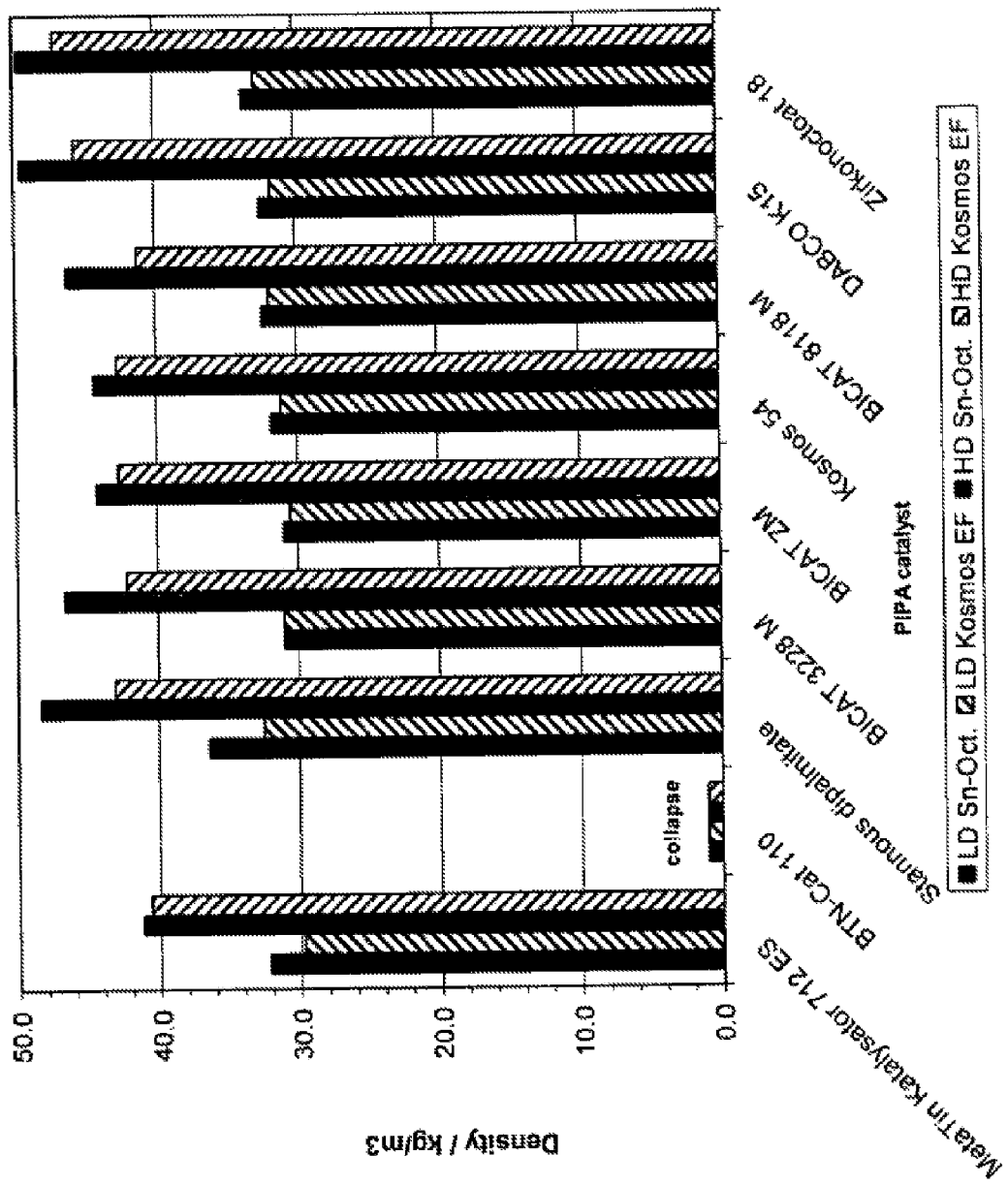
FIGURE 2: Density of box foams made by formulations given in Table 7

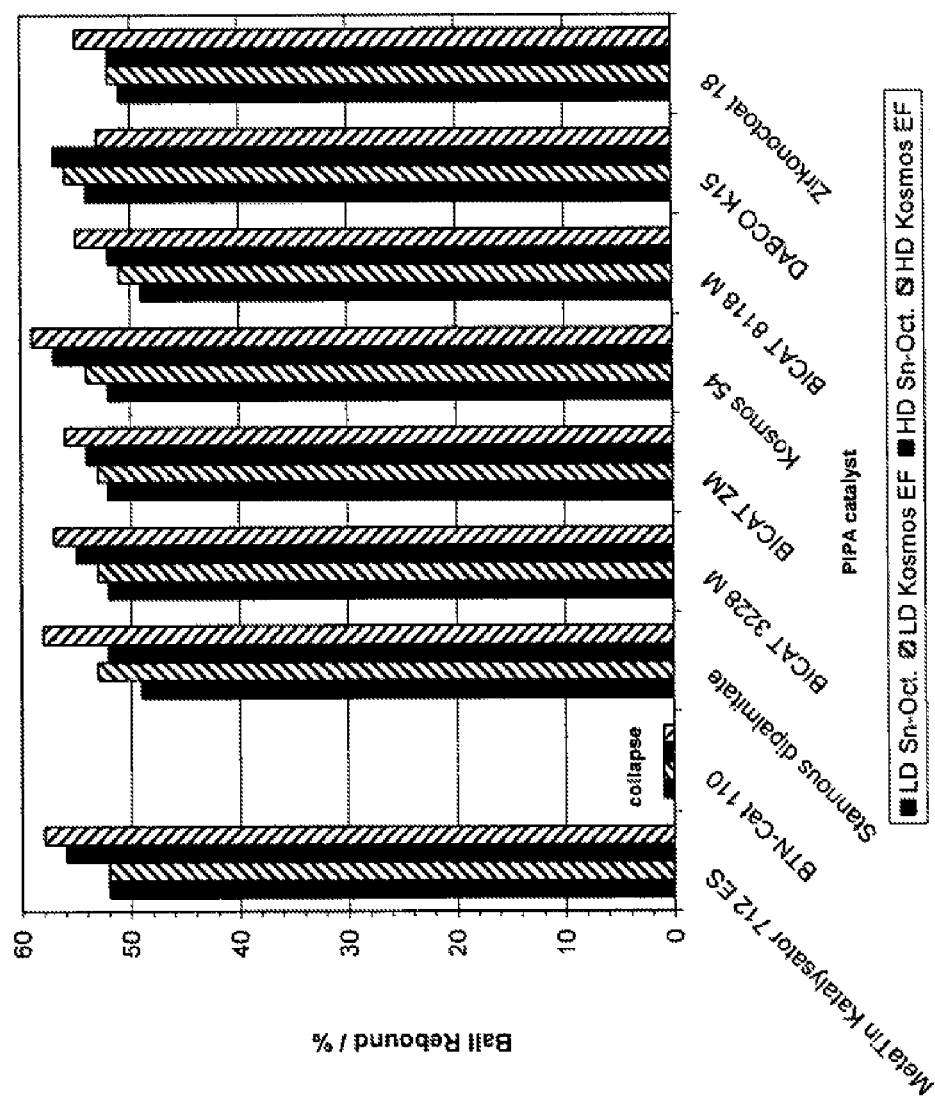
FIGURE 3: Ball rebound of box foams made by formulations given in Table 7

POLYURETHANE FOAM

This invention relates to polyurethane (PU) foam.

Methods for the manufacture of flexible open-celled PU foam are known in the art and are covered, for example, on pages 161-233 of the Polyurethane Handbook, edited by Dr Güenter Oertel, Hanser Publishers.

Conventionally, flexible PU foam may be made by reacting a polyol with a multifunctional isocyanate so that NCO and OH groups form urethane linkages by an addition reaction, and the polyurethane is foamed with carbon dioxide produced in situ by reaction of isocyanate with water. This conventional process may be carried out as a so-called 'one-shot' process whereby the polyol, isocyanate and water are mixed together so that the polyurethane is formed and foamed in the same step.

Reaction of isocyanate with polyol gives urethane linkages by an addition reaction.

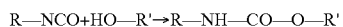   I.

Isocyanate reacts with water to give amine and carbon dioxide.

   II.

Amine reacts with isocyanate to give urea linkages.

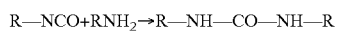   III.

Interaction of NCO, OH, $H_2O$ will give PU chains which incorporate urea linkages as a consequence of above reactions I, II, III occurring at the same time.

Flexible PU foam typically has a segmented structure made up of long flexible polyol chains linked by polyurethane and polyurea aromatic hard segments with hydrogen bonds between polar groups such as NH and carbonyl groups of the urea and urethane linkages.

In addition, the substituted ureas (formed in III) can react with remaining isocyanate to give a biuret (IV), and the urethane can react with remaining isocyanate to give allophanates (V):

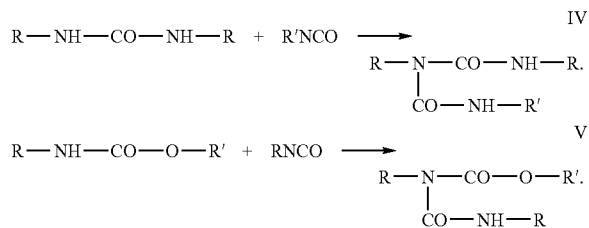

Biuret and allophanate formation results in increase in hard segments in the polymer structure and cross-linking of the polymer network.

The physical properties of the resulting foam are dependent on the structure of the polyurethane chains and the links between the chains.

For higher levels of foam hardness, and in particular to make rigid closed cell foam, polyurethane chain cross-linking is brought about e.g. by use of shorter chain polyols and/or by inclusion of high functionality isocyanates. It is also known to incorporate unsaturated compounds as radical cross-linking agents.

For many applications an open-celled PU foam which is stable and hard, i.e. has high load bearing properties, is desirable.

So called high resilience ('HR') PU foam, formerly referred to as cold-cure foam, is a well known category of soft PU foam and is characterised by a higher support factor and resilience compared with so-called 'Standard' or 'Conventional' foams. The choice of starting materials and formulations used to make such foams largely determine the properties of the foam, as discussed in the Polyurethane Handbook by Dr. Güenter Oertel, for example, at page 182 (1$^{st}$ Edition), pages 198, 202 and 220 (2$^{nd}$ Edition) and elsewhere. The starting materials or combinations of starting materials used in HR PU foam formulations may be different from those used in standard foam formulations whereby HR is considered a distinct separate technology within the field of PU foam. See page 202 table 5.3 of the above 2$^{nd}$ Edition.

HR foam is usually defined by the combination of its physical properties and chemical architecture as well as its appearance structurally. HR foams have a more irregular and random cell structure than other polyurethane foams. One definition of HR foams for example, is via a characteristic known as the "SAG factor" which is the ratio of Indentation Force Deflection (IFD), or Indentation Load Deflection (ILD) at 65% deflection to that at 25% deflection (ASTM D-1564-64T). IFD (or ILD) is the force required to keep a foam sample indented for a period of time, typically the force in pounds (0.45 kg) required to deflect a 15"×15"×4" (38.1 cm×38.1 cm×10.16 cm) block with a 50 sq.ins (322.58 sq.cms) plate for 1 minute. Standard foams have a SAG factor of about 1.7-2.2, while an HR foam has a factor of about 2.2-3.2. HR foam may also have characteristic differences in other physical properties. For example HR foam may be more hydrophilic and have better fatigue properties compared to standard foam. See the above mentioned handbook for reference to these and other differences.

Originally HR foam was made from 'reactive' polyether polyol and higher or enhanced functionality isocyanate. The polyol was typically a higher than usual molecular weight (4000 to 6000) ethylene oxide and/or propylene oxide polyether polyol having a certain level of primary hydroxyl content (say over 50% as mentioned at page 182 of the above 1$^{st}$ Edition Handbook), and the isocyanate was MDI (methylene diphenyl-diisocyanate) (or mixture of MDI and TDI (toluene diisocyanate), or a prepolymer TDI, but not TDI alone (see page 220 of the above 2$^{nd}$ Edition Handbook under Cold Cure Moulding). Subsequently (page 221) a new family of polyols, now called polymer-modified polyols (also known as polymer polyols) were developed based on special polyether polyols with molecular weights of about 4000 to 5000 and with primary hydroxyl contents in excess of 70%. These together with different isocyanates, but now mainly pure TDI, were used with selected cross-linking agents, catalysts and a new class of HR silicones in the production of this new generation of HR foams.

This new family of HR foams have similar properties to those obtained using the original approach but their physical properties, including load bearing could now be varied over a wider range. The processing safety of the new foams was greatly enhanced and this enabled production of these foams using the more commercially available TDI compared to the former necessity to use mixed or trimerised isocyanates.

Polymer-modified polyols contain polymeric filler material in a base polyol. The filler material may be incorporated as an inert filler material dispersed in the base polyol, or at least partially as a copolymer with the base polyol. Example filler materials are copolymerized acrylonitrile-styrene polymer polyols (as described in GB 1482213), the reaction product of diisocyanates and diamines ("PHD" polyols as described in GB 1501172), and the polyaddition product of diisocyanates with amine alcohols ("PIPA" polyols as described in U.S. Pat. No. 4,374,209).

Polymer-modified polyols have also found use in the formulating of standard foams giving foams with higher load bearing properties.

Catalysts are used to influence the polyol/isocyanate polyurethane-forming reaction and to regulate cell formation in the foaming process.

Metal organic catalysts are commonly used to promote reaction between the isocyanate and the polyol. Well known catalysts include stannous octoate and dibutyltindilaurate (DBTL). These catalysts promote a number of side reactions and are often used with amines which increase their activity. Metal organic catalysts act as Lewis acids and are thought to function by forming an intermediate complex with an isocyanate group and a polyol hydroxyl group.

DBTL is conventionally preferred for the manufacture of speciality polyurethane foams, particularly HR foams. The main advantage is that it avoids so-called cold flow or block trapeze effects. This is thought to be because the tin-carbon bond is less sensitive to hydrolysis or oxidation than the tin-oxygen bond, possibly due to steric hindrance of the tin atom, whereby the catalyst remains active longer in the foam promoting more cross-linking and avoiding settling of the foam.

DBTL is the preferred catalyst in the manufacture of PIPA polymer-modified polyol, and also in the manufacture of HR foams based on polymer-modified polyol formulations as described above. However, there is the problem that DBTL gives rise to residual material arising from the tin-carbon bond, such as dibutyl or tributyl tin substances, which can be undesirable or unacceptable due to biocidal properties.

As explained further hereinafter (with reference to Table 2), it has been found that use of stannous octoate, which is a standard catalyst in the manufacture of polyether based polyurethane foams, when used conventionally instead of DBTL, is not successful. Stannous octoate has a tendency to decompose rapidly in the presence of residual amounts of moisture and/or oxygen and/or temperature and this deactivates the catalyst and can seriously affect the stability of the foaming system in the context of PIPA HR foam formulations.

The PIPA polymer-modified polyol referred to above is made by reacting an olamine or amine alcohol with an organic polyisocyanate (having two or more isocyanate groups) in the presence of a polyol, the olamine reacting at least predominantly polyfunctionally with the isocyanate. The olamine has one or more hydroxyl (OH) groups and also one or more amine groups whether primary, secondary or tertiary (—NH$_2$, =NH, ≡N) and a polyaddition product is formed with the polyisocyanate. The polyaddition product may be mixed (e.g. as a solution or stable dispersion) and/or chemically combined (as by copolymerisation) with the polyol.

The polyaddition reaction may be catalysed using metal organics such as are commonly used to catalyse the isocyanate/polyol polyurethane foam reaction as mentioned above.

An object of the present invention is to provide a catalyst which can successfully substitute for DBTL particularly in the context of PIPA polymer-modified polyol manufacture and polyurethane foam manufacture using HR polymer-modified polyol formulations, and which can be as effective as DBTL yet which can avoid environmental tin-carbon bond problems such as those associated with dibutyl and tributyl tin residuals.

According to one aspect of the invention therefore there is provided a method of making a polymer-modified polyol wherein an olamine is reacted with an organic polyisocyanate in the presence of a polyol and at least one catalyst which is a metal salt of an organic acid, the olamine reacting at least predominantly polyfunctionally with the isocyanate, wherein the, or at least one, said catalyst is selected from a metal salt of an organic acid having no metal-carbon bond, and wherein the viscosity of the polymer-modified polyol is at least 2250 mPa·s.

References herein to viscosity are to be understood as viscosities calculated at 25° C. using a Brookfield or Brookfield compatible viscometer. Typically the viscosity was measured after 30 mins with a 100 rpm spindle using a rotational coaxial cylinder (Searle-type) viscometer such as Haake Viscometer VT 550. The spindle may be a rotor SV DIN 53019.

In accordance with the present invention it has been found, unexpectedly, that the olamine-polyol-isocyanate reaction can be efficiently catalysed, to produce useful, stable, polymer-modified polyol materials, using metal carboxylate catalysts not having metal-carbon bonds. Problems of toxicity associated with metal-carbon catalysts, such as dibutyl tin dilaurate (DBTL), can therefore be avoided.

Moreover, it has been found that the resulting polymer-modified polyol materials can be used to make stable foam products having desirable structural properties comparable with, or even better than foam products made using conventional polymer-modified polyol obtained using DBTL as catalyst. Without wishing to be bound by any explanation or mechanism, it is believed that these benefits arise because the use of non-metal-carbon bond catalysts in the context of a viscosity of at least 2250 mPa·s results in new and advantageous polymer-modified polyols possibly having a different extent or mode of reaction between the olamine and polyol hydroxyl groups, and the isocyanate groups. The viscosity may be at least 2400 mPa·s, or at least 2500 mPa·s.

It has been found that, by selecting and controlling the viscosity to be at least 2250 mPa·s, and preferably greater than 2500 mPa·s, it may even be possible to obtain useful polymer-modified polyol with stannous octoate.

Catalysts may include one or more of:

Stannous octoate (stannous-2-ethyl hexanoate $(C_7H_{15}COO)_2Sn$), stannous dilaurate $((C_{11}H_{23}COO)_2Sn)$, Stannous dipalmitate $((C_{15}H_{32}COO)_2Sn)$, Stannous distearate $((C_{17}H_{36}COO)_2Sn)$, Stannous dioleate $((C_{17}H_{33}COO)_2Sn)$, Stannous diricinoleate $((C_{17}H_{34}COO)_2Sn)$, Zinc octoate $((C_7H_{15}COO)_2Zn)$, Zinc dineodecanoate $((C_9H_{19}COO)_2Zn)$, Zinc diricinoleate $((C_{17}H_{34}COO)_2Zn)$, Bismuth trineodecanoate $((C_9H_{19}COO)_3Bi)$, Potassium octoate $((C_7H_{15}COO)K)$, Zirconium octoate (zirconium tetra-2-ethylhexanoate $(C_7H_{15}COO)_4Zr)$.

In one embodiment, the catalyst has the formula:

where M is a metal

R is a carbon chain of 6 to 20 carbons (linear or branched, with or without a side functional group i.e. OH and/or double bonds).

Thus, in accordance with a second aspect of the present invention there is provided a method of making a polymer-modified polyol wherein an olamine is reacted with an organic polyisocyanate in the presence of a polyol and at least one catalyst which is a metal salt of an organic acid, the olamine reacting at least predominantly polyfunctionally with the isocyanate, wherein the, or at least one, said catalyst is of the formula:

where M is a metal

R is a carbon chain of 6 to 20 carbons (linear or branched, with or without a side functional group i.e. OH and/or double bonds).

The carbon chain (R) may have 6 to 16 carbons.

In a further embodiment, the catalyst is a metal salt of a monohydroxy fatty acid.

Thus, in accordance with a third aspect of the invention there is provided a method of making a polymer-modified polyol wherein an olamine is reacted with an organic polyisocyanate in the presence of a polyol and at least one catalyst which is a metal salt of an organic acid, the olamine reacting at least predominantly polyfunctionally with the isocyanate, wherein the, or at least one, said catalyst is a metal salt of a monohydroxy fatty acid.

The monohydroxyl fatty acid may be 12 hydroxy-(cis)-9-octadecanoic acid, or ricinoleic acid.

In accordance with the invention it has been found that stannous ricinoleate is particularly useful. Other metal salts, such as zinc sodium or calcium ricinoleate may also be used.

It has been found that in both the production of the polymer-modified polyol, and the production of the polyurethane foam, the use of the hydroxy fatty acid catalyst can give rise to excellent quality HR PU foam notwithstanding the absence of a metal-carbon bond. It is thought that incorporating the bulky hydroxy fatty acid group in the catalyst alongside the tin or other metal atom can both avoid the formation of unstable species and, by steric hindrance, delay the hydrolysis of the catalyst thereby helping stability of the formulations.

The use of ricinoleic acid is known in polyurethane production e.g. as described in U.S. Pat. No. 6,194,475, and also GB 1332700, but not in relation to flexible PU foam systems comparable with those to which the present invention relates, particularly HR foams and polymer-modified polyol systems.

The invention also provides a method of making flexible polyurethane foam wherein the polymer-modified polyol described above is reacted with an isocyanate in the presence of a metal carboxylate catalyst to form polyurethane material which is foamed.

The metal carboxylate foam-forming catalyst may be a non-carbon-metal bond catalyst selected from those described above in relation to the formation of the polymer-modified polyol. The foam-forming catalyst may be the same as or different from the catalyst used in making the polymer-modified polyol. In one embodiment tin octoate or tin diricinoleate is used as the foam-forming catalyst. The non-carbon-metal bond catalyst may be used as the main or sole metal carboxylate catalyst in one or both of the polymer-modified polyol and foam-forming reactions. Where it is not used as the sole metal carboxylate catalyst for both reactions, any other suitable metal catalyst or catalysts may be used additionally thereto or instead thereof. Such other catalysts may include DBTL, stannous octoate and the like. The arrangement is preferably such that no other metal catalyst is used having a carbon-metal bond, or no DBTL is used, in both of the said reactions.

With reference to the PIPA polymer-modified polyol as mentioned above, as described in greater detail hereinafter, the carrier polyol may be any suitable polyol, such as a polyether polyol, the isocyanate may be any suitable multi-functional isocyanate, such as TDI or MDI, and the olamine may be any suitable olamine such as triethanolamine—all for example as described in U.S. Pat. No. 4,374,209.

With reference to the polyurethane foam forming reaction, this preferably uses both polymer-modified polyol and HR formulations, although non-HR formulations are also possible.

The polyurethane foam-forming reaction may use multi-functional isocyanate such as TDI or MDI and any suitable polyol or polyols which may be additional to the polymer-modified polyol e.g. polyether polyol, any suitable blowing agent such as water alone or with other substances, any suitable catalyst or catalysts additional to a metal carboxylate catalyst such as an amine catalyst, a silicone catalyst or the like, all as described for example in U.S. Pat. No. 4,374,209.

As mentioned in connection with the first aspect of the present invention, the viscosity of the polymer-modified polyol is greater than 2500 mPa·s. A range of 2500-4500 mPa·s may be used.

Attainment of the desired viscosity is achieved by selection of the proportion of the metal carboxylate catalyst, and, if desired, adjustment of the stoichiometric proportion of the isocyanate. That is, the desired viscosity can be attained as a consequence of the combination of the amount of isocyanate and the amount of catalyst. It has been found that stable polymer-modified polyols having a viscosity in the desired range and which can be used to make stable polyurethane foams, can be readily formed using relatively low proportions of catalyst, and, indeed, reduction in proportion of the catalyst advantageously can enhance viscosity and usefulness of the polymer-modified polyol. Thus the concentration of the metal carboxylate catalyst used in making the polymer-modified polyol is preferably in range 0.001-0.1 mMoles/100 gms polyol, particularly 0.005-0.05, particularly 0.006-0.012.

As discussed further hereinafter, the isocyanate may be used in an index range of 90 to 120, preferably 95 to 110, relative to the theoretical stoichiometric amount required to react with all available olamine hydroxyl groups (index 100), calculating the olamine as bi functional.

Raw materials and based formulations:

With regard to the polyol used in making the polymer-modified polyol and/or the PU foam, this may be of any suitable kind. Typically polyether and polyester polyols are used in the production of PU foam and in accordance with the present invention it is preferred that the polyol is wholly or at least predominantly a polyether polyol. Where a polyether polyol is used this is preferably wholly or predominantly a reactive polyol ie containing a significant amount of ethylene oxide (EO) capping or tip, although wholly or predominantly non-EO capped polyols or all propylene oxide (PO) polyols may also be used. Suitable polyols may have an OH functionality of 2 to 6, particularly 2 to 4 and may have a molecular weight (MW) in the range 400-20,000. All types of other polyols like polyols derived from renewable resources (so called natural oil polyols or NOP's) can also be used pure or in mixtures as long as they have the right reactivity features.

It is well known in the art to use mixed polyols to vary the reactivity of the system or impart desired properties to the resulting PU foam and, with the present invention, whilst reactive polyether polyol is generally preferred, other polyols and mixtures of polyols may be used as required.

Examples of the polyether polyols that can be used according to the invention are described, for example, on pages 44-54 and 75-78 of the Plastics Manual, Volume 7, Polyurethanes, Becker/Braun, $2^{nd}$ edition, published by Carl Hanser Verlag.

Thus, for example, polyol may be as follows:

I. derived from EO and PO and trimethylolpropane with viscosity (at 25 degrees C.) 750-900 mPa·s, OH number 35±2.

All viscosity measurements (in mPa·s) are obtained using a Brookfield Viscometer. The OH number (hydroxyl number) is a conventional parameter which gives the concentration of NCO-reactive OH groups per unit weight in mgKOH/g.

$$\text{Hydroxyl number (OH)} = \frac{56.1 \times \text{functionality}}{\text{MW polyol}} \times 1{,}000$$

It is also possible to use those polyether polyols which already contain built-in catalysts, as for example described in WO 03/016373A1. It is likewise also possible to use mixtures of the aforementioned polyether polyols.

A preferred polyol is a triol which is a propylene oxide adduct of glycerine and has a molecular weight of the order of 5,000. Commercial examples are Voranol 4820 (The Dow Chemical Company), or DESMOPHEN 44 WB 23 (formerly Desmophen 3223) (Bayer).

With regard to the multifunctional isocyanate this is preferably a diisocyanate, particularly TDI (toluene diisocyanate). However other multifunctional isocyanates, preferably having a functionality of 2 to 5 may be used alone or in any suitable combination. The same isocyanate may be used both in the production of the PIPA and in the subsequent production of the foam, or different isocyanates may be used.

Thus, the multifunctional isocyanate may be any one or more of:

TDI (all isomer blends of toluene diisocyanate),
MDI (methylene diphenyl isocyanate),
which may be pure or polymeric versions (so called aromatic isocyanates).

More particularly, the multifunctional isocyanate is a polyisocyanate containing two or more isocyanate groups and standard commercial di- and/or triisocyanates are typically used. Examples of suitable ones are aliphatic, cycloaliphatic, arylaliphatic and/or aromatic isocyanates, such as the commercially available mixtures of 2,4- and 2,6-isomers of diisocyanatotoluene (=tolylenediisocyanate TDI), which are marketed under the trade names Caradate® T80 (Shell) or Voranate® T80 and T65 (The Dow Chemical Company). 4,4'-diisocyanatodiphenylmethane (=4,4' methylenebis(phenylisocyanate); MDI) and mixtures of TDI and MDI can also be used. It is also possible, however to use isocyanate prepolymers based on TDI or MDI and polyols. Modified or mixed isocyanates (for example Desmodur® MT58 from Bayer) may also be used. Examples of aliphatic isocyanates are 1,6-hexamethylene diisocyanates or triisocyanates such as Desmodur® N100 or N3300 from Bayer.

The relative proportions of the olamine and isocyanate which react to form the PIPA, and the MW (molecular weight) of the polyol, may be selected as required.

Standard calculations are as follows:
To make a PIPA 97/10 (index 97, 10% polymer content), the requirements are:

% *TEOA* (triethanolamine)=149 (molecular weight of *TEOA*)×10 (% solids) divided by 149+(174 (*MW* of *TDI*)×97 (index)/100)

This means: TEOA=4.69%, TDI=5.31% and base polyol=90%

In practice the hydroxyl number of the PIPA can be determined from the relationship OH(*PIPA*)=OH(Base Polyol)×(100−polyol content)/100+377×*TEOA* %/100

OH(Polyol) is the hydroxyl number of the starting polyol which typically may be 35. MW(NCO) is the molecular weight of the isocyanate which is 174 for TDI.

According to the PIPA index the viscosity of the PIPA will vary. High prepolymer viscosity can also have advantageous properties with regard to control of stability during rise, where this is required but conventional polyether slabstock machines cannot generally handle viscosities above 5000 mPa·s.

Viscosity is determined by the proportion of isocyanate index used, relative to the theoretical amount of isocyanate by weight required to react with all available hydroxyl groups of the olamine, and also by the original viscosity of the polyol or polyols mixture used to form the PIPA. The index maybe 90 to 120 preferably 95 to 111.

Other ingredients may also be incorporated as auxiliary agents or additives in forming the PIPA.

These include, in particular, auxiliary agents such as chain extending agents, cross-linking agents and chain terminators.

Low molecular weight, isocyanate-reactive, difunctional compounds, such as diethanolamine or water, for example, or higher-functional compounds, such as triethanolamine, glycerine or sugar alcohols such as sorbitol may be used as chain extending agents and/or cross-linking agents.

Isocyanate-reactive, monofunctional compounds, such as monohydric alcohols, primary and secondary amines, may be used as chain terminators.

Yet further auxiliary agents known in the art, such as flame retardants pigments or fillers may also be added.

The PIPA may incorporate or, prior to foaming may be mixed with other substances. For example, unreacted polyol of the same or different kind may be added e.g. to dilute the prepolymer to give a lower viscosity or to modify reactivity of the system or the properties of the resulting foam.

Typically, for foam production, the PIPA will be mixed with water and/or other blowing agent, isocyanate, one or more catalysts, and one or more other ingredients such as a foam stabiliser.

Foaming may be on a batch or continuous basis and the mixture may be gassed with nitrogen.

In more detail, the foaming ingredients may comprise one or more of:

a) Isocyanates, such as aliphatic, cycloaliphatic, arylaliphatic and/or aromatic isocyanates. Examples are commercially available compounds of 2,4- and 2,6-isomers of di-isocyanatotoluene (=tolylenediisocyanate TDI). Trade names are Caradate® T80 from Shell, Voranate® T80 and T65 from The Dow Chemical Company. It is also possible to use 4,4'-diisocyanatodiphenylmethane (=4,4'-methylenebis(phenylisocyanate); MDI) and mixtures of MDI and TDI.

Furthermore isocyanate prepolymers based on TDI or MDI and polyols may also be used. A further possibility would be modified or mixed isocyanates (e.g. Desmodur® MT58 from Bayer). Examples of aliphatic isocyanates are 1,6-hexamethylene diisocyanates or triisocyanates, e.g. Desmodur® N100 or N3300 from Bayer.

The isocyanate may be the same as or different from the isocyanate used to make the PIPA.

b) Water, preferably 0.5 to 10 parts by weight to one hundred parts of polyol or PIPA or polyol/PIPA mixture by weight.

c) Liquid CO2 can also be used as additional blowing agent.

d) Other additives may also optionally be used, particularly those well known in the PU foaming art, such as catalysts, in particular an amine, such as DMEA (dimethyl ethanolamine), DABCO® 33 LV (a tertiary amine from Air Products), and/or a metallo-organic compounds such as a tin catalyst e.g. KOSMOS 29 (stannous octoate) or other catalysts such as zinc octoate or other metal carboxylates described above; foam stabilizers known in the art, for example specific silicone surfactant such as the Tegostab® range from Goldschmidt or the Silbyk® range from BYK-Chemie; chain extending agents and/or cross-linking agents, such as diethanolamine, glycerine, sorbitol; as well as flame retardants; fillers. Those additives and others known in the art in relation to conventional foaming processes may be used in any combination.

e) Nitrogen for gassing and controlling the cell structure (size and size distribution).

For foaming, it is also possible, where necessary, to work under a reduced or excess pressure; processing conditions for this are disclosed, for example, in U.S. Pat. No. 5,194,453.

f) Additionally specific additives to reduce/eliminate cold flow may be used in the formulation. These include for example Ortegol 204 from Goldschmidt or the experimental additive LPX 21205 from Byk.

BRIEF DESCRIPTION OF THE DRAWINGS

FIG. 1 is a bar chart showing viscosity of PIPA made by various catalysts;

FIGURE is a bar chart showing density of box foams made by formulations given in Table 7 herein; and FIG. 3 is a bar chart showing ball rebound of box foams made by formulations given in Table 7 herein.

The invention will now be described further with reference to the following Examples.

EXAMPLES 1-3

Formation of PIPA Samples (Table 1)

Three samples of PIPA polymer-modified polyol, referred to as PIPA 1, 2, 3 (respectively Examples 1, 2, 3) were made by reacting triethanolamine with toluene diisocyanate (TDI) in the presence of a carrier polyol and also a metal organic catalyst, namely: DBTL in the case of PIPA 1; stannous octoate in the case of PIPA 2; and stannous ricinoleate in the case of PIPA 3.

To 1000 g of the polyol in a 1.5 liter open flask was added the triethanolamine. The mixture was stirred for 15 seconds. The TDI was added while stirring for a further 15 seconds. The catalyst diluted in the polyol was added with a syringe and the mixture stirred for 10 seconds. The flask was capped and the viscosity was measured after 24 hrs and 72 hrs. The resulting polyaddition product was formed as a stable dispersion in the carrier polyol.

The viscosities, after allowing to stand for 3 days, are given in Table 1. Proportions here and in other Tables are parts per hundred parts by weight relative to 100 parts polyol.

TABLE 1

| | Example 1 Ref. PIPA 1 | Example 2 Counter example PIPA 2 | Example 3 Example of the invention PIPA 3 |
| --- | --- | --- | --- |
| Desmophen 3223 | 100 | 100 | 100 |
| Triethanolamine | 5.2 | 5.2 | 5.2 |
| TDI Voranate T 80 | 6.2 | 6.2 | 6.7 |
| Dibutyltindilaurate | 0.03 | | |
| Stannous octoate | | 0.02 | |
| Kosmos EF | | | 0.01 |
| Viscosity (25 Deg. C.) after 3 days (mPa · s) | 3320 | 2120 | 3360 |

EXAMPLES 4-5

Comparison of Foam Made with PIPA 1 (DBTL) and PIPA 2 (Stannous Octoate) (Table 2)

The PIPA polymer-modified polyols made in accordance with PIPA 1 and PIPA 2 of Examples 1, 2 were mixed with water toluene diisocyanate and further polyol and allowed to foam in the presence of catalysts, as shown in Table 2.

Foam test methods used in this document are the following:

Density (kg/m3) DIN EN ISO 845

Compression Load Deflection (CLD) in kPa and Hysteresis (%) DIN EN ISO 3386-1

Airflow (cfm) and Ball Rebound (%) ASTM 1564-72

Tensile strength (kPa) and elongation (%) DIN EN ISO 1799

Compression set (%) DIN EN ISO 1856

The resulting product was a stable foam in the case of Example 4—PIPA 1 (DBTL) but collapsed in the case of Example 5—PIPA 2 (stannous octoate). The viscosity of PIPA 2 was too low.

TABLE 2

| | Example 4 | Example 5 |
| --- | --- | --- |
| PIPA 1 | 100 | |
| PIPA 2 | | 100 |
| Voranate T-80 | 33.1 | 33.1 |
| Water (total) | 2.335 | 2.335 |
| Tegostab B 8681 | 0.5 | 0.5 |
| DEOA 90% | 0.72 | 0.72 |
| Ortegol 204 | 1.2 | 1.2 |
| Sn-Oct 33% DOP | 0.2 | 0.2 |
| Foam | Stable | Collapse |

EXAMPLES 6-16

Comparison of Standard Foams with Foams in Accordance with the Invention (Tables 3-5)

Tables 3, 4, 5 show various polyurethane foam formulations.

Table 3 shows two Examples (7, 8) in accordance with the invention compared with a reference standard DBTL/stannous octoate formulation (Example 6).

Table 4 shows three examples (10, 11, 12) (two in accordance with the invention) compared with a reference standard DBTL/stannous octoate formulation (Example 9) and a failed Example (Example 12).

Table 5 shows two examples (14, 15), one in accordance with the invention, compared with a reference standard DBTL/stannous octoate formulation (Example 13) and a failed Example (Example 14).

In each case, the Examples show that stannous ricinoleate can be used in the manufacture of the PIPA polymer-modified polyol, in substitution for DBTL or stannous octoate and an HR foam having excellent properties is obtained notwithstanding the use of a catalyst not having a metal-carbon bond.

The examples show use of the ricinoleate for the PIPA-forming reaction and/or for the PU foam-forming reaction in various combinations, alone and with other conventional metal organic catalysts.

TABLE 3

|  | Example 6 Standard | Example 7 Example of the invention 1 | Example 8 Example of the invention 2 |
|---|---|---|---|
| PIPA 1 | 100 |  |  |
| PIPA 2 |  |  |  |
| PIPA 3 |  | 100 | 100 |
| Voranate T-80 | 33.6 | 33.6 | 33.6 |
| Water (total) | 2.33 | 2.333 | 2.333 |
| Tegostab B 8681 | 0.5 | 0.5 | 0.5 |
| DEOA 90% | 0.72 | 0.72 | 0.72 |
| Ortegol 204 | 1.7 | 1.7 | 1.7 |
| Sn-Oct 33% DOP | 0.15 | 0.15 | — |
| Kosmos EF | — | — | 0.15 |
| Foam | Stable | Settling | Stable |
| Density (kg/m 3) | 38.2 | 46.4 | 41.4 |
| 40% CLD (kPa)* | 3.54 | 5.19 | 4.12 |
| Airflow (CFM)** | 3.5 | 2.9 | 4.9 |

*Compression Load Deflection
**Cubic Feet per Minute

TABLE 4

|  | Example 9 Standard | Example 10 Example of the invention 1 | Example 11 Example of the invention 2 | Example 12 Failed Example |
|---|---|---|---|---|
| PIPA 1 | 100 |  |  |  |
| PIPA 2 |  |  |  | 100 |
| PIPA 3 |  | 100 | 100 |  |
| Voranate T-80 | 33.1 | 33.1 | 33.1 | 33.1 |
| Water (total) | 2.335 | 2.335 | 2.335 | 2.335 |
| Tegostab B 8681 | 0.5 | 0.5 | 0.5 | 0.5 |
| DEOA 90% | 0.72 | 0.72 | 0.72 | 0.72 |
| Dabco 33LV | 0.2 | 0.2 | 0.2 | 0.2 |
| Sorbex RS | 0.71 | 0.71 | 0.71 | 0.71 |
| Sn-Oct 33% DOP | 0.2 | 0.2 | — | 0.2 |
| Kosmos EF | — | — | 0.25 |  |
| Foam | Stable | Stable | Stable | Unstable |
| Density (kg/m3) | 40.8 | 45.3 | 40.5 |  |
| 40% CLD (kPa) | 3.17 | 4.16 | 3.5 |  |
| Airflow (CFM) | 5.5 | 4.8 | 6.0 |  |

TABLE 5

|  | Example 13 Standard | Example 14 Failed example | Example 15 Example of the invention 2 |
|---|---|---|---|
| Desmophen 3223 | 85 | 85 | 85 |
| PIPA 1 | 15 |  |  |
| PIPA 2 |  | 15 |  |
| PIPA 3 |  |  | 15 |
| Voranate T-80 | 41.2 | 41.2 | 41.2 |
| Water (total) | 2.81 | 2.81 | 2.81 |
| Tegostab B 8681 | 0.3 | 0.3 | 0.3 |
| DEOA 90% | 1.45 | 1.45 | 1.45 |
| Ortegol 204 | 3.0 | 3.0 | 3.0 |
| Sn-Oct 33% DOP | 0.12 | 0.12 | — |
| Kosmos EF | — | — | 0.3 |
| Foam | Stable | Collapse | Stable |
| Density (kg/m 3) | 42.9 |  | 39 |
| 40% CLD (kPa) | 2.9 |  | 2.0 |
| Airflow (CFM) | 6 |  | 5.9 |

Explanation of Ingredients and Parameters

Desmophen 3223 is a reactive polyether polyol with ethylene oxide tip, MW approximately 5000, made by Bayer AG.

Voranate T80 is a toluene diisocyanate made by The Dow Chemical Company.

Kosmos EF is stannous ricinoleate made by Evonik Goldschmidt GmbH.

Viscosity is measured in mPa·s using a Haake Viscometer VT 550.

Tegostab B8681 is a silicone stabilizer/cell regulator from Evonik Goldschmidt GmbH.

Ortegol 204 is a proprietary catalys/processing aid package from Evonik Goldschmidt GmbH.

DABCO 33LV is 33% triethylenediamine in propylene glycol made by Air Products and Chemicals Inc.

Further comparisons were undertaken as follows:

1. Metal Catalysts

Table 6 shows the list of catalysts used to make PIPAs.

TABLE 6

Catalysts used to make PIPA

| Catalyst | | | | |
|---|---|---|---|---|
| Trade name | Chemical Name | Supplier | Number of carbons | Chain length |
| MetaTin Katalysator 712 ES | Dibutyltin dilaurate | Acima Chemical Industries Ltd. Inc. | 12 | 12 |
| BTN-Cat 110 | Stannous octoate | BNT Chemicals GmbH, Bitterfeld | 8 | 6 |
| Stannous dipalmitate | Stannous dipalmitate | CityChemical LLC | 16 | 16 |
| BICAT 3228 M | Zinc octoate | The Shepherd Chemical Company | 8 | 6 |
| BICAT ZM | Zinc neo-decanoate | The Shepherd Chemical Company | 10 | 8 |
| Kosmos 54 | Zinc ricinoleate | Evonik Goldschmidt GmbH | 18 | 18 |
| BICAT 8118 M | Bismuth neo-decanoate | The Shepherd Chemical Company | 10 | 8 |

TABLE 6-continued

Catalysts used to make PIPA

| Catalyst | | | | |
|---|---|---|---|---|
| Trade name | Chemical Name | Supplier | Number of carbons | Chain length |
| DABCO K15 | Potassium octoate | Air Products | 8 | 6 |
| Zirkonoctoat 18 | Zirconium octoate | Acima Chemical Industries Ltd. Inc. | 8 | 6 |

In order to make a fair comparison of catalysts the same amount of moles was used to prepare the PIPA as for Example 1 in Table 1 i.e. it corresponds to 0.03 php of DBTDL or 0.046742 mMoles of catalyst per 100 gram of polyol, with 6.2 php TDI, and the viscosity was measured as in Example 1 after 72 hrs.

The resulting PIPA gave the viscosities given in FIG. 1.

All catalysts give usable PIPA dispersions.

All the PIPAs were used to make foam using two formulations as described in Table 7, with SO, Kosmos EF, and in certain case the same catalyst as used for the PIPA, as the foaming catalyst.

TABLE 7

Foam Formulations

| | High density (HD) | Low density (LD) |
|---|---|---|
| PIPA | 100 | 83 |
| Desmophen 3223 | | 17 |
| Voranate T-80 | 33.1 | 42.6 |
| Water (total) | 2.34 | 3.03 |
| Tegostab B 8681 | 0.5 | 0.5 |
| DEOA 90% | 0.72 | 0.8 |
| Ortegol 204 | 1.2 | 1.82 |
| Sn-Oct 33% DOP (Kosmos EF) | 0.15/(0.15) | 0.2/(0.15) |
| Index | 97 | 104 |

The resulting foam properties are summarized in FIG. 2.

In all cases, foams made using Kosmos EF as foam curing catalyst have a lower density (meaning that they are more stable) than the foams made using stannous octoate.

Other properties are also in tendency better. For instance the ball rebound of virtually all Kosmos EF based foams is higher than with SO meaning the foam is more elastic/resilient, as shown in FIG. 3.

This shows the importance of using PIPA dispersions having viscosites of at least 2250 and preferably over 2500 mPa·s, which can be readily achieved using certain metal catalysts with otherwise conventional formulations, such catalysts being better in this context than stannous octoate. Also, it can be seen that tin ricinolate (Kosmos EF) is a better catalyst than SO in foaming.

A further example of the advantages of a PIPA based on Kosmos EF and Kosmos EF as a foaming catalyst is given in Table 8:

TABLE 8

| | Reference | Invention |
|---|---|---|
| PIPA 1 | 85 | |
| PIPA 3 | | 70 |
| Desmophen 3223 | 15 | 30 |
| Voranate T-80 | 33.1 | 34.5 |

TABLE 8-continued

| | Reference | Invention |
|---|---|---|
| Water (total) | 2.34 | 2.34 |
| Silbyk 9715 | 0.1 | 0.1 |
| DEOA 90% | 0.72 | 0.9 |
| Ortegol 204 | 1.4 | 1.8 |
| Sn-Oct 33% DOP/ Kosmos EF | 0.15 | 0.2 |
| Index | 99 | 103 |
| Density (kg/m3) | 38.8 | 38.6 |
| 40% CLD (kPa) | 3.32 | 3.05 |
| Hysteresis (%) | 24.9 | 20.3 |
| Elongation (%) | 105 | 121 |
| Airflow (cfm) | 4.5 | 5.3 |
| Ball rebound (%) | 59 | 65 |
| 75% C. set (%) | 4.2 | 3.8 |

It is of course to be understood that the invention is not intended to be restricted to the details of the above Examples which are given by way of example only.

The invention claimed is:

1. A method of making a polymer-modified polyol, wherein an olamine is reacted with an organic polyisocyanate in the presence of a polyol and at least one catalyst which is a metal salt of an organic acid, the olamine reacting at least predominantly polyfunctionally with the isocyanate, wherein the, or at least one, catalyst is present in a proportion of 0.006-0.01 mmol/100 grams polyol, and wherein the viscosity of the polymer-modified polyol is at least 2250 mPa·s. when measured at 25° C. using a Brookfield or Brookfield compatible viscometer.

2. The method according to claim 1, wherein the viscosity of the polymer-modified polyol is at least 2400 mPa·s.

3. The method according to claim 1, wherein the viscosity of the polymer-modified polyol is at least 2500 mPa·s.

4. The method according to claim 1, wherein the at least one catalyst is of the formula:

where M is a metal

R is a carbon chain of 6 to 20 carbons.

5. A method of making a polymer-modified polyol, wherein an olamine is reacted with an organic polyisocyanate in the presence of a polyol and at least one catalyst which is present in a proportion of 0.006-0.012 mmol/100 grams polyol and is a metal salt of an organic acid, the olamine reacting at least predominantly polyfunctionally with the isocyanate, wherein the, or at least one, said catalyst is of the formula:

where M is a metal

R is a carbon chain of 6 to 20 carbons.

6. The method according to claim 5, wherein R is a carbon chain of 6 to 16 carbons.

7. The method according to claim 6, wherein the at least one catalyst is a metal salt of a monohydroxy fatty acid.

8. A method of making a polymer-modified polyol, wherein an olamine is reacted with an organic polyisocyanate in the presence of a polyol and at least one catalyst which is present in a proportion of 0.006-0.012 mmol/100 grams polyol and is a metal salt of an organic acid, the olamine reacting at least predominantly polyfunctionally with the isocyanate, wherein the, or at least one, said catalyst is a metal salt of a monohydroxy fatty acid.

9. The method according to claim 8, wherein the at least one catalyst is a metal ricinoleate salt.

10. The method according to claim 9, wherein the at least one catalyst is selected from the group consisting of tin and zinc diricinoleate.

11. The method according to claim 1, wherein the at least one catalyst is selected from the group consisting of Stannous octoate, Stannous dilaurate, Stannous dipalmitate, Stannous distearate, Stannous dioleate, Zinc octoate, and Zinc dineodecanoate.

12. The method according to claim 1, wherein the at least one catalyst is selected from the group consisting of Bismuth trineodecanoate, Potassium octoate, and Zirconium octoate.

13. The method according to claim 1, wherein the olamine is triethanolamine.

14. The method according to claim 13, wherein the polyol is at least predominantly a polyether polyol.

15. The method according to claim 14, wherein the isocyanate is selected from the group consisting of TDI (toluene diisocyanate) and MDI (methylene diphenyl isocyanate).

16. The method according to claim 15, wherein the isocyanate index is 90-120.

17. The method according to claim 16, wherein the isocyanate index is 95 to 111.

18. A polymer-modified polyol made by the method of claim 17.

19. A method of making polyurethane foam, wherein the polymer-modified polyol of claim 18 is reacted with an isocyanate in the presence of a metal carboxylate catalyst to form polyurethane material which is foamed.

20. The method according to claim 19, wherein the metal carboxylate catalyst is a metal salt of an organic acid having no metal-carbon bond.

21. The method according to claim 20, wherein the metal carboxylate catalyst is a metal salt of a monohydroxy fatty acid.

22. The method according to claim 20 wherein the metal carboxylate catalyst is selected from the group consisting of tin octoate and tin diricinoleate.

23. The method according to claim 19, wherein the metal carboxylate catalyst is the same as the metal carboxylate catalyst used in forming the polymer-modified polyol.

24. Flexible polyurethane foam made by the method of claim 19.

25. Polyurethane foam according to claim 24 which is a high resilience foam.

* * * * *